(12) United States Patent
Ryu et al.

(10) Patent No.: US 10,062,376 B2
(45) Date of Patent: *Aug. 28, 2018

(54) ELECTRONIC APPARATUS AND VOICE RECOGNITION METHOD FOR THE SAME

(71) Applicant: SAMSUNG ELECTRONICS CO., LTD., Suwon-si (KR)

(72) Inventors: Hee-seob Ryu, Suwon-si (KR); Seung-kwon Park, Yongin-si (KR); Jong-ho Lea, Seongnam-si (KR); Jong-hyuk Jang, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 268 days.

This patent is subject to a terminal disclaimer.

(21) Appl. No.: 14/598,801

(22) Filed: Jan. 16, 2015

(65) Prior Publication Data

US 2015/0127344 A1 May 7, 2015

Related U.S. Application Data

(63) Continuation of application No. 12/683,721, filed on Jan. 7, 2010, now Pat. No. 8,965,764.

(30) Foreign Application Priority Data

Apr. 20, 2009 (KR) .......................... 10-2009-0034240

(51) Int. Cl.
   *G10L 17/00* (2013.01)
   *G10L 15/08* (2006.01)

(52) U.S. Cl.
   CPC .............. *G10L 15/08* (2013.01); *G10L 17/00* (2013.01)

(58) Field of Classification Search
   CPC ........ G10L 13/08; G10L 13/033; G10L 13/00; G10L 13/047; G10L 15/26; G10L 13/027;
   (Continued)

(56) References Cited

U.S. PATENT DOCUMENTS 6,088,669 A * 7/2000 Maes ...................... G10L 17/00
   704/231
6,088,674 A * 7/2000 Yamazaki ............... G10L 13/04
   704/266

(Continued)

FOREIGN PATENT DOCUMENTS

| JP | 05-027790 A | 2/1993 |
| JP | 2005-122128 A | 5/2005 |
| JP | 2009-060394 A | 3/2009 |

OTHER PUBLICATIONS

Communication dated Aug. 27, 2015 issued by the Korean Intellectual Property Office in counterpart Application No. 10-2009-0034240.
Communication from the Korean Intellectual Property Office dated Feb. 10, 2015 in a counterpart Korean application No. 10-2009-0034240.
Communication dated Feb. 25, 2016, issued by the Korean Intellectual Property Office in counterpart Korean Application No. 10-2009-0034240.

(Continued)

*Primary Examiner* — Huyen Vo
(74) *Attorney, Agent, or Firm* — Sughrue Mion, PLLC

(57) ABSTRACT

Disclosed are an electronic apparatus and a voice recognition method for the same. The voice recognition method for the electronic apparatus includes: receiving an input voice of a user; determining characteristics of the user; and recognizing the input voice based on the determined characteristics of the user.

27 Claims, 7 Drawing Sheets

(58) Field of Classification Search
CPC ..... G10L 15/22; G10L 13/07; G10L 13/0335; G10L 13/04; G10L 13/043; G10L 13/10; G10L 15/063; G10L 15/187; G06F 17/289
USPC ............... 704/1–10, 230–260, 270–275
See application file for complete search history.

(56) References Cited

U.S. PATENT DOCUMENTS

| | | | |
|---|---|---|---|
| 6,122,615 | A | 9/2000 | Yamamoto |
| 6,219,640 | B1 | 4/2001 | Basu et al. |
| 6,442,519 | B1 | 8/2002 | Kanevsky et al. |
| 6,567,776 | B1 | 5/2003 | Chang et al. |
| 6,738,457 | B1 | 5/2004 | Pickering et al. |
| 7,272,562 | B2 | 9/2007 | Olorenshaw et al. |
| 7,881,934 | B2 | 2/2011 | Endo et al. |
| 8,041,082 | B1 | 10/2011 | Baluja et al. |
| 2003/0110038 | A1 | 6/2003 | Sharma et al. |
| 2005/0060158 | A1 | 3/2005 | Endo et al. |
| 2005/0144012 | A1* | 6/2005 | Afrashteh ............ G06F 17/289 704/277 |
| 2008/0147397 | A1* | 6/2008 | Konig ................. G10L 21/02 704/246 |
| 2008/0189099 | A1* | 8/2008 | Friedman .......... G06F 17/30772 704/8 |
| 2010/0185434 | A1* | 7/2010 | Burvall ............... G06F 17/289 704/3 |
| 2010/0185444 | A1 | 7/2010 | Olsen |

OTHER PUBLICATIONS

Communication dated Jan. 3, 2013, issued by the United States Patent and Trademark Office in U.S. Appl. No. 12/683,721.
Communication dated Apr. 10, 2013, issued by the United States Patent and Trademark Office in U.S. Appl. No. 12/683,721.
Communication dated Jul. 24, 2013, issued by the United States Patent and Trademark Office in U.S. Appl. No. 12/683,721.
Communication dated Nov. 14, 2013, issued by the United States Patent and Trademark Office in U.S. Appl. No. 12/683,721.
Communication dated Feb. 27, 2014, issued by the United States Patent and Trademark Office in U.S. Appl. No. 12/683,721.
Communication dated Jun. 27, 2014, issued by the United States Patent and Trademark Office in U.S. Appl. No. 12/683,721.
Extended European Search Report issued in Application No. 10159202.0, dated Aug. 31, 2010.
M. Farrus, et al.; "On the Fusion of Prosody, Voice Spectrum and Face Features for Multimodal Person Verification"; Department of Signal Theory and Communications; four (4) pages total; XP-002593205.
Kunzel, et al.; "The Relation Between Speech Tempo, Loudness and Fundamental Frequency: An Important issue in forensic speaker recognition"; Science and Justice, vol. 35 No. 4, Jan. 1, 1995; pp. 291-295.
Sadeghi, et al.; "Speaker age interval and sex identification based on Jitters, Shimmers and Mean MFCC using supervised and unsupervised discriminative classification methods"; Signal Processing, The 8th International Conference on, IEEE, PI; Nov. 16, 2006, pp. 1-4; XP031600707; ISBN 978-0-7803-9736-1.

\* cited by examiner

ELECTRONIC APPARATUS AND VOICE RECOGNITION METHOD FOR THE SAME

CROSS-REFERENCE TO RELATED APPLICATION

This application is a continuation of U.S. application Ser. No. 12/683,721, filed on Jan. 7, 2010 in the U.S. Patent and Trademark Office, which claims priority from Korean Patent Application No. 10-2009-0034240, filed on Apr. 20, 2009 in the Korean Intellectual Property Office, the disclosures of which are incorporated herein by reference in their entirety.

BACKGROUND OF INVENTION

1. Field of Invention

Apparatuses and methods consistent with the present invention relate to voice recognition, and more particularly, to recognizing voice of a user by taking a user's characteristics into account.

2. Description of the Related Art

In recent years, electronic apparatus have utilized a voice recognition function to recognize voice of a user as human computer interaction (HCI) for achieving a people-oriented interface.

According to the voice recognition function, the electronic apparatus receives and recognizes an input voice as a user's command, and performs an operation corresponding to the user's command. Thus, it is important for the voice recognition function to correctly recognize an input voice of a user without error.

A human voice is different according to sex, age, etc. For example, a female has a tone or pitch which is about 30% higher than that of a male, and a child has a tone or pitch that is about 60% higher than that of an adult.

Thus, the electronic apparatus has to take a user's characteristics such as sex, age, etc. into account in order to correctly recognize a voice through the voice recognition function.

SUMMARY OF THE INVENTION

According to an aspect of the present invention, there is provided a voice recognition method for an electronic apparatus, including: receiving an input voice of a user; determining characteristics of the user; and recognizing the input voice based on the determined characteristics of the user.

The determining the characteristics of the user may include determining at least one of sex and age of the user.

The determining the characteristics of the user may include obtaining from the input voice at least one of a frequency, a tempo, a level, a pitch, a tone, a frequency perturbation (jitter) and an amplitude perturbation (shimmer) of the input voice.

The determining the characteristics of the user may include comparing a voice-model database with the determined at least one of the frequency, the tempo, the level, the pitch, the tone, the frequency perturbation (jitter) and the amplitude perturbation (shimmer) of the input voice.

The voice-model database may include at least one of a standard frequency, a tempo, a level, a pitch, a tone, a frequency perturbation (jitter) and an amplitude perturbation (shimmer) of a voice model corresponding to the characteristics of the user.

The voice recognition method may further include: generating a responsive voice to the input voice corresponding to the determined characteristics of the user; and outputting the generated responsive voice.

The generating the responsive voice may include generating the responsive voice to have at least one of a frequency, a tempo, a level, a tone and a pitch thereof corresponding to the determined characteristics of the user.

The voice recognition method may further include controlling the electronic apparatus based on the recognized input voice.

The voice recognition method may further include displaying the determined characteristics of the user.

The determining the characteristics of the user may include: receiving an image of the user; and determining the characteristics of the user based on the received image of the user.

The determining the characteristics of the user may include determining the characteristics of the user based on the input voice of the user.

According to another aspect of the present invention, there is provided an electronic apparatus with a voice recognition function, including: a voice input unit which receives an input voice of a user; and a controller which determines characteristics of the user and recognizes the input voice based on the determined characteristics of the user.

The controller may determine at least one of sex and age as the characteristics of the user.

The controller may determine the characteristics of the user by determining at least one of a frequency, a tempo, a level, a pitch, a tone, a frequency perturbation (jitter) and an amplitude perturbation (shimmer) of the input voice.

The electronic apparatus may further include a storage unit which stores a voice-model database, wherein the controller determines the characteristics of the user by comparing the voice-model database with the determined at least one of the frequency, the tempo, the level, the pitch, the tone, the frequency perturbation (jitter) and the amplitude perturbation (shimmer) of the input voice.

The voice-model database may include at least one of a standard frequency, a standard tempo, a standard level, a standard pitch, a standard tone, a standard frequency perturbation (jitter) and a standard amplitude perturbation (shimmer) of a voice model corresponding to the characteristics of the user.

The electronic apparatus may further include a voice output unit which generates a responsive voice to the input voice, wherein the controller generates the responsive voice to the input voice corresponding to the determined characteristics of the user and controls the voice output unit to output the generated responsive voice.

The controller may generate the responsive voice to have at least one of a frequency, a tempo, a level, a tone and a pitch thereof corresponding to the determined characteristics of the user.

The controller may control the electronic apparatus based on the recognized input voice.

The electronic apparatus may further include a display unit which displays the determined characteristics of the user.

The electronic apparatus may further include an image input unit which receives an image of the user, wherein the controller determines the characteristics of the user based on the received image of the user.

The controller may determine the characteristics of the user based on the input voice of the user.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Certain exemplary embodiments of the present invention are described below in detail with reference to the accompanying drawings.

Figure 1:
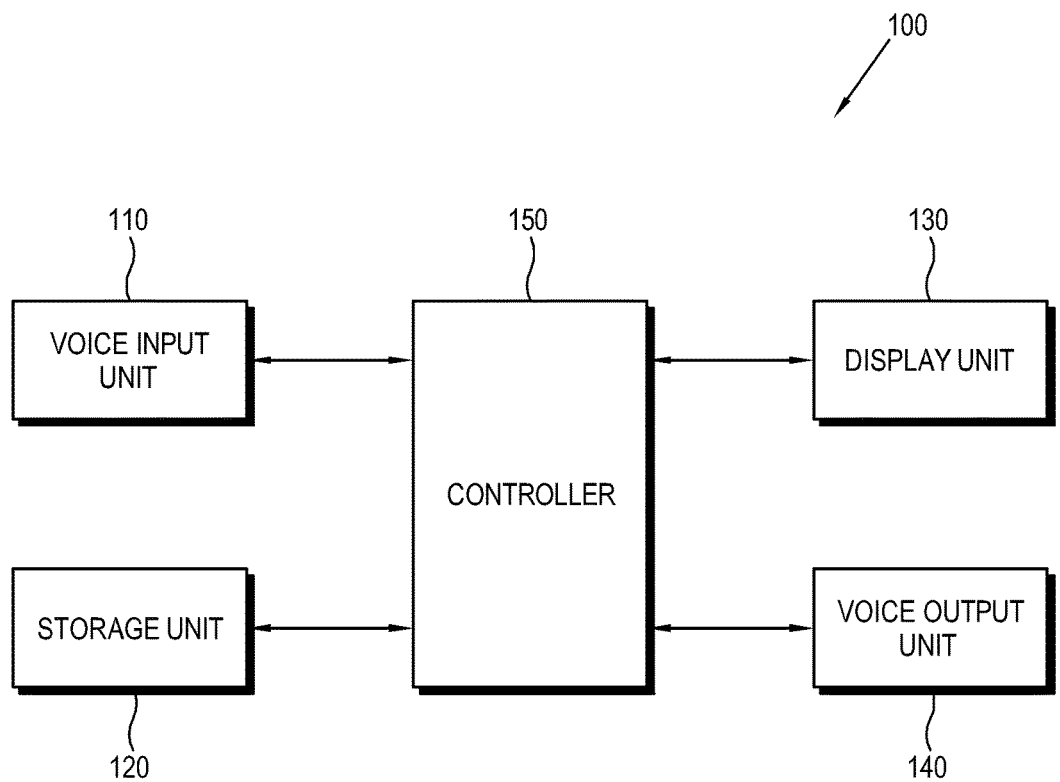
FIG. 1 is a block diagram of an electronic apparatus according to a first exemplary embodiment.

FIG. 1 is a block diagram of an electronic apparatus 100 according to a first exemplary embodiment.

The electronic apparatus 100 in this exemplary embodiment has a voice recognition function to receive a user's command based on a voice and perform an operation corresponding to the received command. The electronic apparatus may be, for example, a mobile device such as a cellular phone, an MPEG-1 Audio Layer 3 (MP3) player, a personal digital assistant (PDA), a navigation system, or a home appliance such as a television, a large format display (LFD), a set-top box (STB), a computer system, etc.

As shown in FIG. 1, the electronic apparatus 100 includes a voice input unit 110, a storage unit 120, a display unit 130, a voice output unit 140 and a controller 150.

The voice input unit 110 receives an input voice as a user's command. In this exemplary embodiment, the voice input unit 110 may include a microphone or the like which can receive a voice of a user.

The storage unit 120 stores a database of different voice models according to characteristics of a user. Here, the characteristics of may include sex, age, etc.

Specifically, voices of users received through the voice input unit 110 are different in characteristics from one another with respect to sex and/or age of users.

Figure 2A:
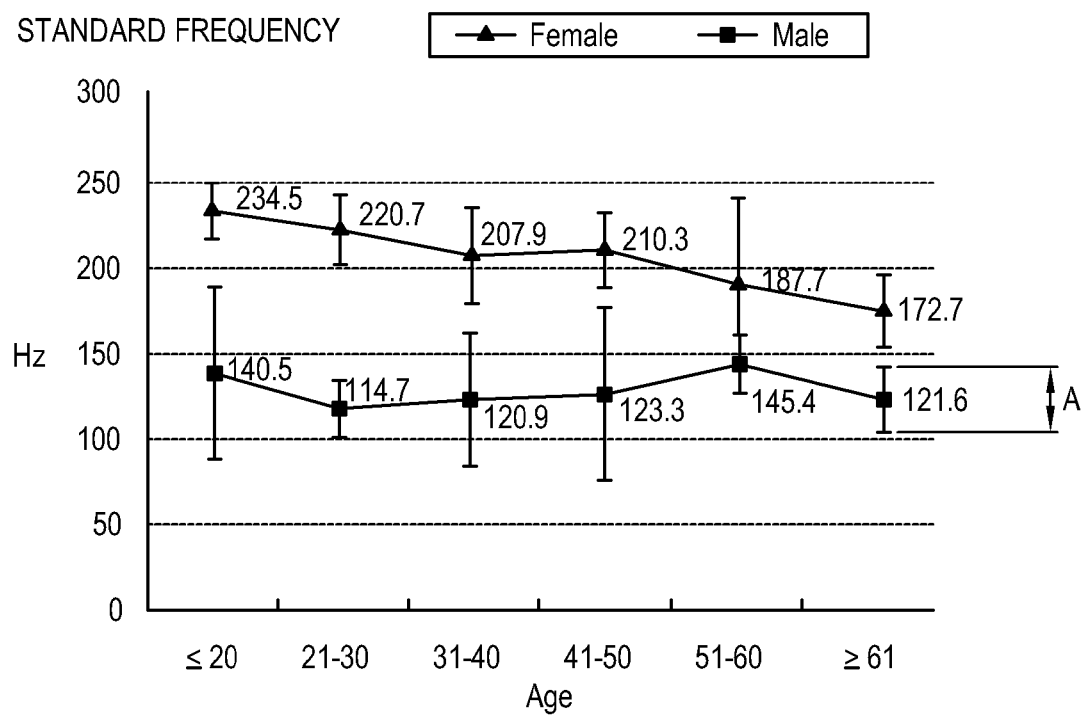
FIGS. 2A to 2C are graphs showing characteristics of an input voice with respect to sex and age of a user, according to exemplary embodiments.
Figure 2B:
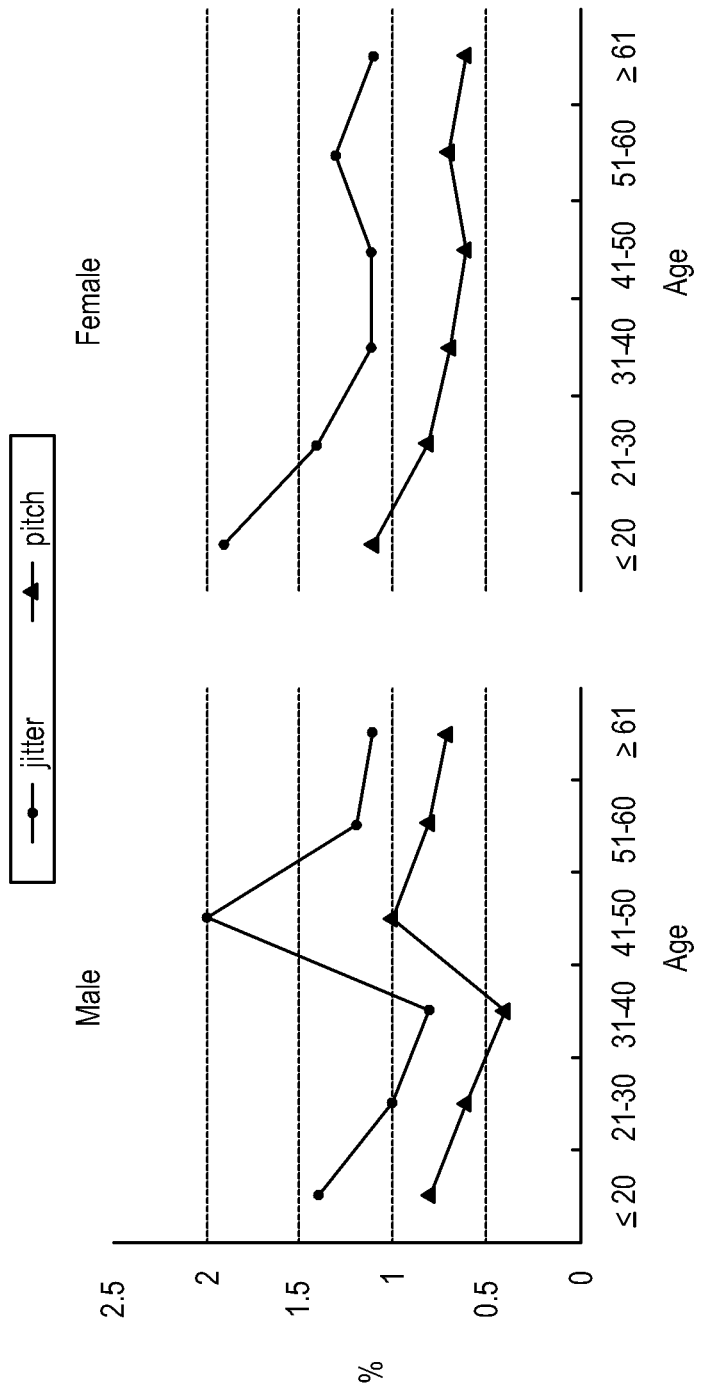
Figure 2C:
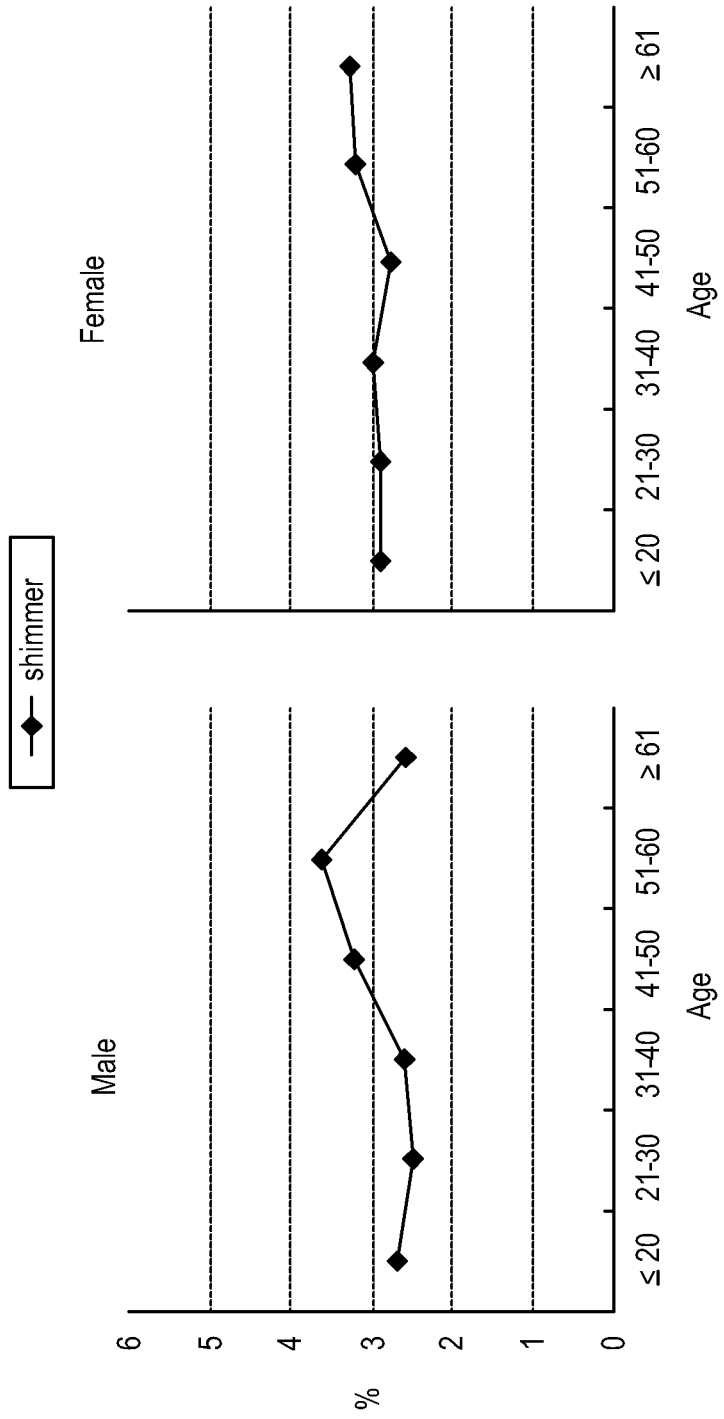

FIGS. 2A to 2C are graphs showing attributes of input voices with respect to sex and age of average human beings.

As shown in FIG. 2A, an average female has a higher standard frequency of an input voice than an average male. Specifically, males have a standard frequency of 122.4±2.4 Hz on average, whereas females have a standard frequency of 122.4±3.1 Hz on average.

Further, referring to FIG. 2A, the standard frequency of an average male in his twenties is lower than that of a teenager. Although the standard frequency of an average male in his forties is stabilized. Individual differences (A) are noticeably large. Thereafter, the standard frequency becomes higher in males in their fifties as compared with males in their twenties and thirties and lower again in males in their sixties.

The standard frequency of an average female gradually decreased between teenage years and thirties, and remarkably decreases after fifties.

Thus, the input voices of users are differentiated according to sex and/or age.

As shown in FIG. 2B, input voices are different in a frequency perturbation (jitter) and a pitch with respect to sex and/or age of users.

Specifically, an average male has a frequency perturbation (jitter) of 1.11±1.11% and a pitch of 0.63±0.57%, and an average female has a frequency perturbation (jitter) of 1.26±0.80% and a pitch of 0.75±0.51%.

The frequency perturbation (jitter) and the pitch of an average male are gradually decreased until he reaches his thirties, max out in his forties, and then decreases again. The frequency perturbation (jitter) and the pitch of an average female gradually decreases as age increases from a child to an old person.

As shown in FIG. 2C, input voices are different in an amplitude perturbation (shimmer) with respect to sex and/or age of users.

Specifically, an average male has an amplitude perturbation (shimmer) of 2.71±1.25%, and an average female has an amplitude perturbation (shimmer) of 2.96±1.72%.

Referring to FIG. 2C, the amplitude perturbation (shimmer) of an average male is stable until he reaches his thirties, gradually increases in his forties, maxes out in his fifties, and then decreases. On the other hand, the amplitude perturbation (shimmer) of an average female changes little throughout her age.

In this exemplary embodiment, the attributes of human voices with respect to sex and age as shown in FIGS. 2A to 2C are tabulated and stored as the voice-model database.

Besides the attributes with respect to sex and age illustrated by FIGS. 2A to 2C, the voice-model database includes tables about a tempo, a tone, a level, etc. of input voices with respect to sex and age.

Further, the voice-model database may be tabulated and stored with respect to other characteristics of human beings as well as sex and age.

The storage unit 120 in this embodiment may include an internal storage medium such as a hard disk drive (HDD), or an external or portable storage medium such as a universal serial bus (USB) memory and a memory card (memory stick, compact flash (CF) card, a multi-media card (MMC)).

The display unit 130 displays the characteristics of a user determined by operation of the controller 150 (to be described later) with regard to a received input voice. The display unit 130 may include a liquid crystal display (LCD), and a driver (not shown) to drive the LCD.

The voice output unit 140 outputs a voice responsive to the input voice received through the voice input unit 110. Here, the responsive voice may be generated to have at least one of the frequency, the tempo, the tone, the level and the pitch corresponding to the characteristics of a user.

The voice output unit 140 in this exemplary embodiment include a speaker capable of making a sound.

The controller 150 performs general control of the electronic apparatus 100. In this exemplary embodiment, the controller 150 may include a central processing unit (CPU) and perform a control operation by executing a predetermined application program.

The controller 150 determines the characteristics of a user based on the attributes of the user's input voice received through the user input unit 110, and generates a responsive voice to correspond to the determined characteristics of the user, thereby outputting the responsive voice through the voice output unit 140.

Specifically, the controller 150 determines at least one of the frequency, the tempo, the level, the pitch, the frequency perturbation (jitter), the amplitude perturbation (shimmer) and the tone of an input voice as the attribute of the input voice, and compares the determined attribute of the input voice with the voice-model database previously stored in the storage unit 120, thereby determining the characteristics, e.g., sex and/or age of the user. Here, the controller 150 may remove noise from the input voice before determining the characteristics of the user with regard to the input voice.

The controller 150 recognizes the input voice based on the determined characteristics of the user, and identifies a command of the user. Thus, the user's command based on the voice is identified in consideration of the characteristics of the user according to sex and/or age, so that voice recognition can be improved in accuracy.

The controller 150 controls the electronic apparatus based on the recognized input voice. That is, the controller 150 performs an operation in response to the user's command identified by the voice recognition. Here, the controller 150 may generate and output a predetermined responsive voice in response to the user's command.

In more detail, the controller 150 may control a responsive voice to be generated according to the characteristics of the user.

For example, the controller 150 may control a responsive voice having a higher level of tone to be output for a user in the user's sixties than those for a user in the user's twenties and thirties. For a male in his twenties, the controller 150 may control a responsive voice to be output corresponding to the standard frequency of an average female in her twenties.

To this end, the storage unit 120 may store the database about sex and/or age of a favorite voice according to the sex and/or age of a user.

Here, a user may store information about the sex and/or age of the user's own favorite responsive voice through an input unit (not shown) such as a separately provided key button, and set up to output a responsive voice based on the previously stored sex and/or age.

Figure 3:
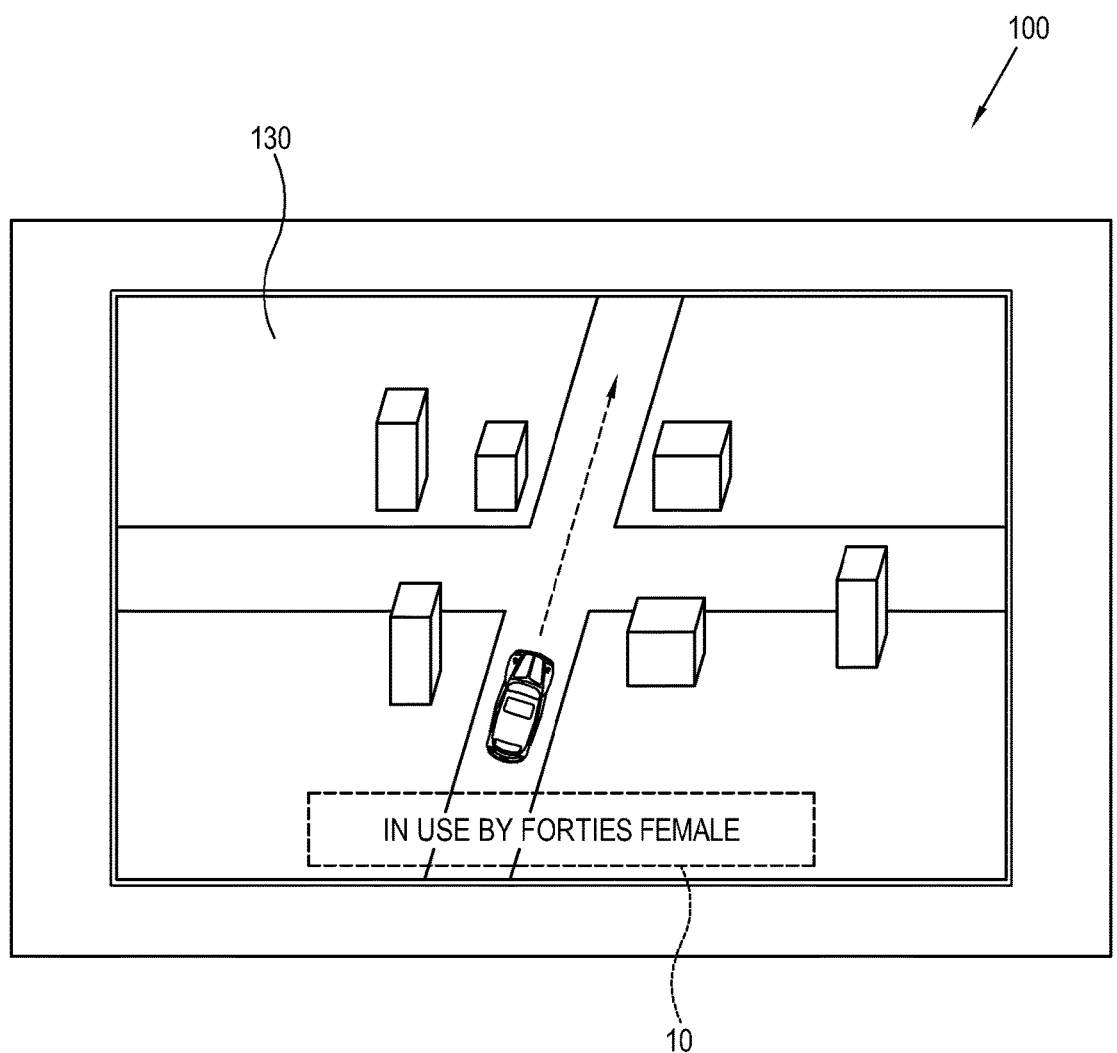
FIG. 3 is a view for explaining an example for operation of an electronic apparatus according to an exemplary embodiment.

FIG. 3 is a view for explaining an example for operation of an electronic apparatus 100 according to an exemplary embodiment.

For example, in a case where the electronic apparatus 100 is a navigation system, the voice input unit 110 may receive an input voice as a user's command to search a path.

The controller 150 may recognize the received input voice and control the electronic apparatus 100 to perform a corresponding operation based on the recognized input voice.

In detail, referring to FIG. 3, the controller 150 controls the display unit 130 to display a path searched corresponding to the input voice of a user.

Here, the controller 150 may determine the characteristics of a user by comparing the attributes of the input voice with the voice-model database stored in the storage unit 120.

Further, the controller 150 may control the display unit 130 to display the determined characteristics of a user to the user through a predetermined message 10 as shown in FIG. 3. Through the message displayed on the display unit 130, a user can ascertain whether the user's characteristics are recognized with regard to the input voice.

The controller 150 recognizes the input voice in view of the determined characteristics of a user, and generates a path-guide voice as a voice responsive to the input voice corresponding to the determined characteristics of the user, thereby outputting a generated responsive voice to the user through the voice output unit 140.

Accordingly, the electronic apparatus 100 in the foregoing exemplary embodiment recognizes the input voice and outputs a responsive voice in consideration of the characteristics of a user, thereby improving accuracy of voice recognition and effect of information transmission.

Figure 4:
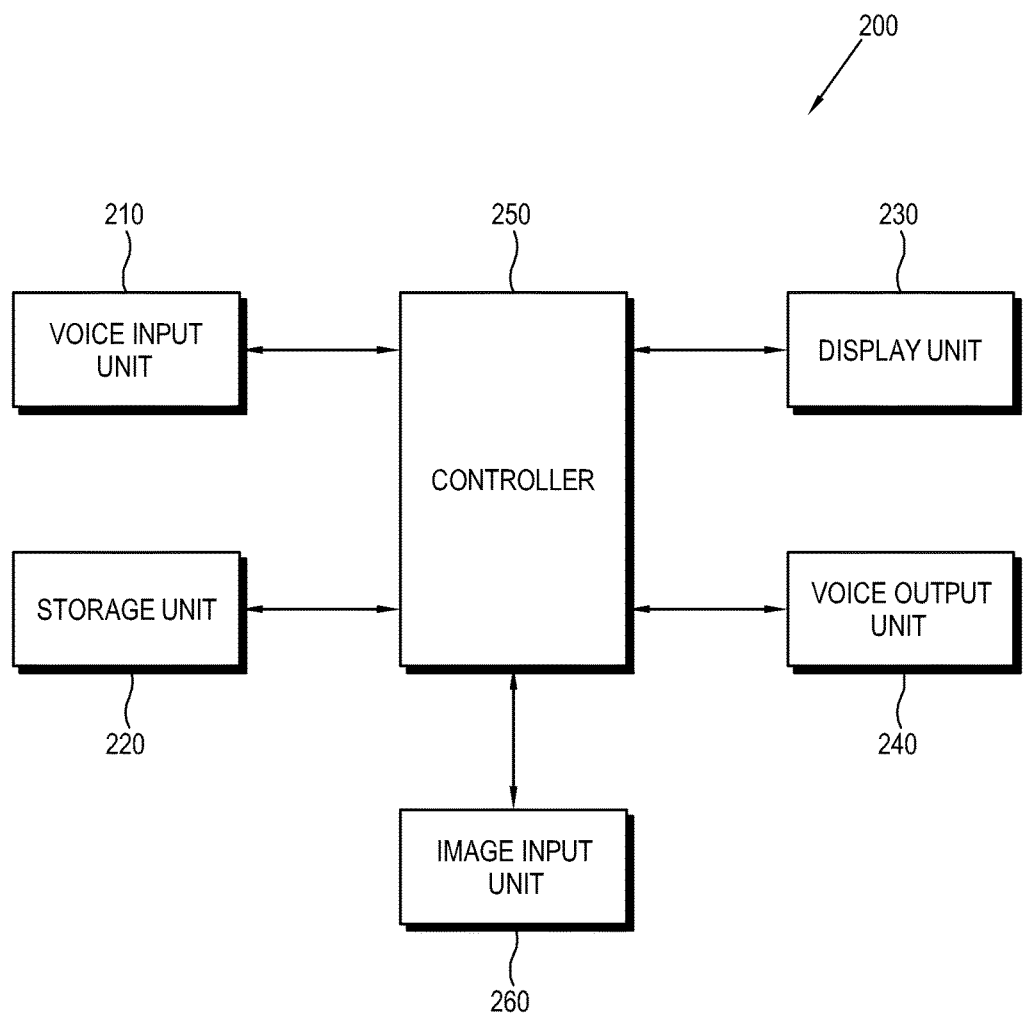
FIG. 4 is a block diagram of an electronic apparatus according to a second exemplary embodiment.

FIG. 4 is a block diagram of an electronic apparatus 200 according to a second exemplary embodiment of the present invention.

The electronic apparatus 200 according to the second exemplary embodiment further includes an image input unit 260 as compared with the electronic apparatus 100 according to the first exemplary embodiment.

The image input unit 260, which receives an image of a user, may include a camera, a camcorder or etc. capable of taking a moving picture or a still picture.

Thus, the storage unit 220 of the electronic apparatus 200 according to the second exemplary embodiment of the present invention further includes an image database where standard image data according to sex and age are stored.

Specifically, the image database standardizes and stores attributes (e.g., a facial form, wrinkles, complexion, a hair style, and a hair color) of appearance according to sex and age of a user.

When receiving the input voice from a user, the controller 250 determines the characteristics such as the sex and/or age of a user by comparing the user's image input through the image input unit 260 with the image database, and recognizes the input voice in consideration of the determined characteristics of the user, thereby performing an operation corresponding to the recognized input voice.

Thus, the electronic apparatus 200 according to the second exemplary embodiment of the present invention may provide improved accuracy of the voice recognition since it can determine the characteristics of a user through an image as well as an input voice.

In the electronic apparatus 200 with the foregoing configuration, a voice recognition method will be described with reference to FIG. 5.

Figure 5:
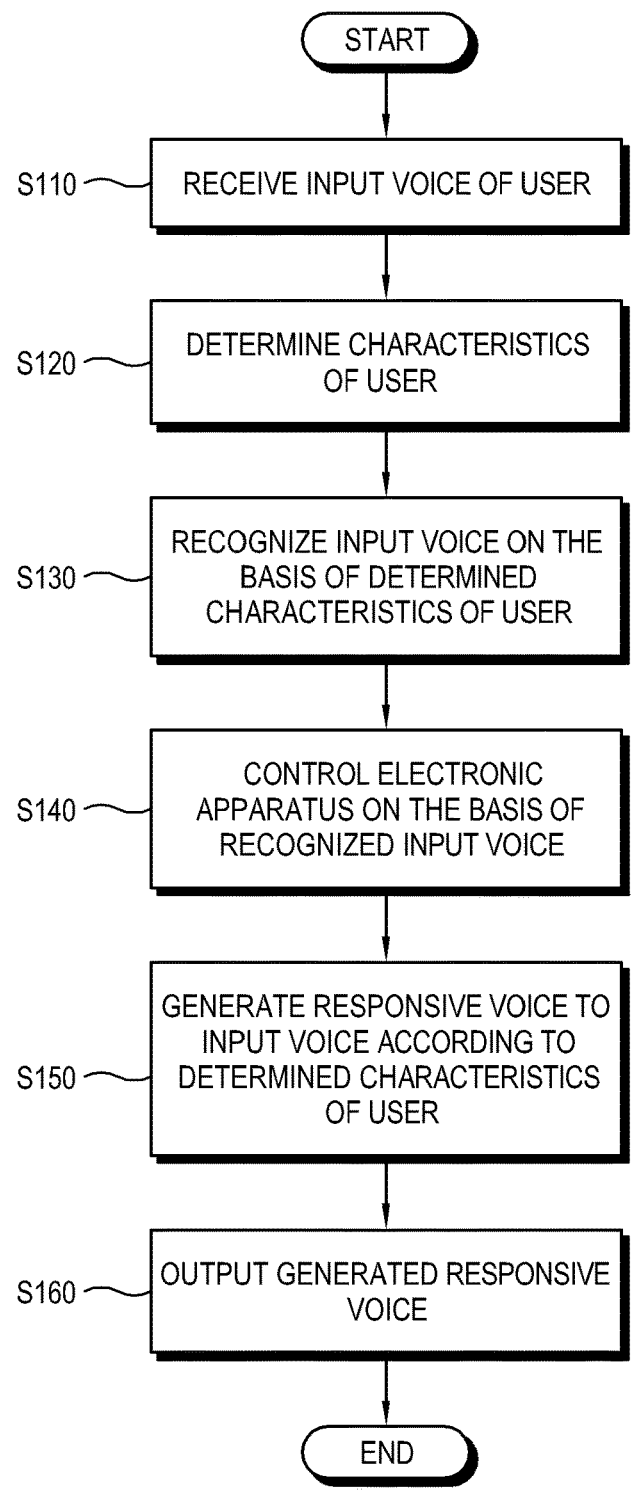
FIG. 5 is a flowchart of a voice recognition method for an electronic apparatus according to an exemplary embodiment.

FIG. 5 is a flowchart of a voice recognition method for an electronic apparatus according to an exemplary embodiment.

As shown in FIG. 5, at operation S110, the electronic apparatus 100 receives a user's input voice corresponding to a command through the voice input unit 210.

At operation S120, the controller 250 determines characteristics of a user based on the input voice received in the operation S110. Here, the controller 250 compares the input voice with the previously stored database to determine the characteristics of a user.

The characteristics of a user determined in the operation S120 may include at least one of sex and age of the user, and the previously stored database may include at least one of the voice-model database and the image database. The voice-model database may store at least one of a standard frequency, a standard tempo, a standard level, a standard pitch, a standard tone, a standard frequency perturbation (jitter) and a standard amplitude perturbation (shimmer) of a voice model corresponding to the characteristics of a user. Further, the image database may store image attributes standardized according to the sex and/or age of a user.

In more detail, the controller 250 determines at least one the frequency, the tempo, the level, the pitch, the frequency perturbation (jitter), the amplitude perturbation (shimmer) and the tone of an input voice as the attribute of the input voice, and compares the determined characteristics attribute of the input voice with the voice-model database of the storage unit 220, thereby determining the characteristics of a user, e.g., the user's sex and/or age.

In the operation S120, the controller 250 may control the display unit 130 to display the determined characteristics of a user.

At operation S130, the controller 250 recognizes the input voice received in the operation S110, based on the user's characteristics determined in the operation S120, and identifies the user's command.

At operation S140, the controller 250 controls the electronic apparatus 200 based on the input voice recognized in the operation S130. That is, the controller 250 performs an operation corresponding to the user's command identified in the operation S130.

At operation S150, the controller 250 may generate a voice responsive to the input voice according to the user's characteristics determined in the operation S120.

Here, the controller 250 may control the responsive voice to have at least one of the frequency, the tempo, the level, the tone and the pitch of the responsive voice correspond to the user's characteristics determined in the operation S120. For example, the responsive voice may be adjusted in the level, the tempo, etc. corresponding to the characteristics of the user, or the responsive voice may be generated as a voice of a certain sex and/or age preferred by a user whose characteristics has been determined.

At operation S160, the controller 250 outputs the responsive voice generated in the operation S150 through the voice output unit 240.

As described above, the exemplary embodiments not only enhances accuracy of voice recognition since the voice recognition is performed according to the characteristics (sex, age, etc.), but may improve effect of information transmission because the responsive voice is generated to correspond to the characteristics of a user.

The present invention is not limited to the foregoing exemplary embodiments and may alternatively be applied to a home appliance, a mobile device or the like various electronic apparatuses which can be controlled by voice.

Although a few exemplary embodiments have been shown and described, it will be appreciated by those skilled in the art that changes may be made in these embodiments without departing from the principles and spirit of the invention, the scope of which is defined in the appended claims and their equivalents.

What is claimed is:

1. A voice recognition method for an electronic apparatus, the voice recognition method comprising:
   receiving, by the electronic apparatus, an input voice signal of a user;
   determining, by the electronic apparatus, characteristics of the user based on attributes of the input voice signal;
   selecting, by the electronic apparatus, a voice model from a plurality of voice models stored in the electronic apparatus to determine the characteristics of the user based on the attributes of the input voice signal by comparing the voice models with the determined attributes of the input voice signal, the plurality of voice models comprising standardized attributes of respective average users and being associated with a plurality of characteristics of the respective average users;
   identifying, by the electronic apparatus, a user's command corresponding to the input voice signal of the user based on the determined characteristics of the user; and
   generating a responsive voice that is responsive to the identified user's command based on the determined characteristics of the user and the selected voice model,
   wherein the determined characteristics of the user correspond to an age of the user,
   wherein the generating the responsive voice comprises determining a tone of the responsive voice based on data stored in a storage unit, the determined tone of the responsive voice correlating with an age preferred by the user corresponding to the determined characteristics, and
   wherein the determined tone of the responsive voice is a higher level of tone when the age of the user is older.

2. The voice recognition method according to claim 1, wherein the electronic apparatus further comprises a display unit configured to display an image.

3. The voice recognition method according to claim 2, further comprising controlling the display unit according to the input voice signal.

4. The voice recognition method according to claim 1, wherein the determining the characteristics of the user comprises determining the attributes of the input voice signal comprising at least one of a frequency, a tempo, a level, a pitch, a tone, a frequency perturbation and an amplitude perturbation of the input voice signal.

5. The voice recognition method according to claim 4, wherein a database of the voice models comprises at least one of a standard frequency, a standard tempo, a standard level, a standard pitch, a standard tone, a standard frequency perturbation and an amplitude perturbation of a voice model corresponding to each of the plurality of voice models.

6. The voice recognition method according to claim 4, further comprising:
   outputting the generated responsive voice,
   wherein the responsive voice corresponds to a voice of at least one of a predetermined sex and a predetermined age preferred by the user whose characteristics have been determined,
   wherein the plurality of voice models are models of respective average users according to at least one among an age range and a gender.

7. The voice recognition method according to claim 6, wherein the generating the responsive voice comprises generating the responsive voice to have at least one of a frequency, a tempo, a level, a tone and a pitch corresponding to the determined characteristics of the user.

8. The voice recognition method according to claim 4, wherein the plurality of voice models are models of respective average users according to at least one among an age range and a gender, and a database of the plurality of voice models is previously stored in the electronic apparatus with respect to the plurality of characteristics of the respective average users and the selecting the voice model.

9. The voice recognition method according to claim 1, further comprising controlling the electronic apparatus based on the identified user's command.

10. The voice recognition method according to claim 1, wherein the responsive voice mimics an age of a user preferred by the user corresponding to the determined characteristics of the user.

11. The voice recognition method according to claim 1, wherein the determining the characteristics of the user comprises determining a sex and the age of the user based on the input voice signal.

12. An electronic apparatus having a voice recognition function, the electronic apparatus comprising:
   a voice input unit configured to receive an input voice signal of a user; and
   a controller configured to determine characteristics of the user based on the input voice signal, to select a voice model from a plurality of voice models stored in the electronic apparatus to determine the characteristics of the user based on attributes of the input voice signal by comparing the voice models with the determined attributes of the input voice signal, the plurality of voice models comprising standardized attributes of respective average users and being associated with a plurality of characteristics of the respective average users, to identify a user's command corresponding to the input voice signal of the user based on the determined characteristics of the user, and to generate a responsive voice that is responsive to the identified user's command based on the determined characteristics of the user and the selected voice model, wherein the determined characteristics of the user correspond to an age of the user, wherein the controller is further configured to determine a tone of the responsive voice based on data stored in a storage unit, the determined tone of the responsive voice correlating with an age preferred by the user corresponding to the determined characteristics, and wherein the determined tone of the responsive voice is a higher level of tone when the age of the user is older.

13. The electronic apparatus according to claim 12, further comprising a display unit configured to display an image.

14. The electronic apparatus according to claim 13, wherein the controller is further configured to control the display unit according to the input voice signal.

15. The electronic apparatus according to claim 12, wherein the controller is further configured to determine the characteristics of the user by determining the attributes of the input voice signal comprising at least one of a frequency, a tempo, a level, a pitch, a tone, a frequency perturbation and an amplitude perturbation of the input voice signal.

16. The electronic apparatus according to claim 15, wherein a database of the plurality of voice models comprises at least one of a standard frequency, a tempo, a level, a pitch, a tone, a frequency perturbation and an amplitude perturbation of a voice model corresponding to each of the plurality of voice models.

17. The electronic apparatus according to claim 15, further comprising a voice output unit configured to output the responsive voice to the input voice signal, wherein the responsive voice corresponding to a voice of at least one of a predetermined sex and a predetermined age preferred by the user whose characteristics have been determined, and wherein the plurality of voice models are models of respective average users according to at least one among an age range and a gender.

18. The electronic apparatus according to claim 17, wherein the controller is further configured to generate the responsive voice to have at least one of a frequency, a tempo, a level, a tone and a pitch thereof corresponding to the determined characteristics of the user.

19. The electronic apparatus according to claim 15, wherein the plurality of voice models are models of respective average users according to at least one among an age range and a gender, and a database of the plurality of voice models is previously stored in the electronic apparatus with respect to the plurality of characteristics of the respective average users and the controller is further configured to select the voice model by using the database of the plurality of voice models.

20. The electronic apparatus according to claim 12, wherein the controller is further configured to control the electronic apparatus based on the identified user's command.

21. The electronic apparatus according to claim 12, wherein the responsive voice mimics an age of a user preferred by the user corresponding to the determined characteristics of the user.

22. The electronic apparatus according to claim 12, wherein the controller is further configured to determine the characteristics of the user by determining a sex and the age of the user based on the input voice signals.

23. A method of operating an electronic apparatus having a voice recognition function, the method comprising:

receiving, by the electronic apparatus, an input voice signal of a user through a voice input unit of the electronic apparatus;

determining, by the electronic apparatus, characteristics of the user by a controller of the electronic apparatus based on attributes of the input voice signal;

selecting, by the electronic apparatus, a voice model from a plurality of voice models stored in the electronic apparatus based on the attributes of the input voice signal by analyzing at least one attribute of the input voice signal with respect to at least one preset attribute of the voice model and determining the voice model based on the analyzed at least one attribute of the input voice signal, the plurality of voice models comprising standardized attributes of respective average users and being associated with plurality of characteristics of the respective average users;

performing, by the electronic apparatus, an operation of the electronic apparatus based on the determined characteristics of the user, the operation being corresponding to the input voice signal of the user; and generating a responsive voice that is responsive to the input voice signal based on the determined characteristics of the user and the selected voice model, wherein the determined characteristics of the user correspond to an age of the user, wherein the generating the responsive voice comprises determining a tone of the responsive voice based on data stored in a storage unit, the determined tone of the responsive voice correlating with an age preferred by the user corresponding to the determined characteristics, and wherein the determined tone of the responsive voice is a higher level of tone when the age of the user is older.

24. The method according to claim 23, wherein the electronic apparatus further comprises a display unit configured to display an image.

25. The method according to claim 24, further comprising controlling the display unit according to the input voice signal.

26. The method according to claim 23, wherein the determining the characteristics of the user comprises determining a sex and the age of the user based on the input voice signals.

27. The method according to claim 23, wherein the responsive voice mimics an age of a user preferred by the user corresponding to the determined characteristics of the user.

* * * * *